Patented Nov. 21, 1939

2,181,098

UNITED STATES PATENT OFFICE 2,181,098

PHENYLMERCURIC CITRATE AND METHOD OF MAKING SAME

Ralph P. Perkins, Midland, Mich., assignor to The Dow Chemical Company, Midland, Mich., a corporation of Michigan No Drawing. Original application July 31, 1933, Serial No. 683,017. Divided and this application November 18, 1938, Serial No. 241,179

3 Claims. (Cl. 260—434)

This invention concerns a new compound, viz. phenylmercuric citrate, and a method of making the same.

Phenylmercuric citrate is prepared, according to the invention, by reacting a phenylmercuric base, preferably phenylmercuric hydroxide, with citric acid. The phenylmercuric hydroxide used as a reactant may be obtained from any source, for example, from benzene by the following procedure: A mixture of mercuric oxide with more than its molecular equivalent each of benzene and of glacial acetic acid is heated to a temperature between 80° and 120° C. until a sample of the mixture is found by analysis to be substantially free of mercuric ions. The mixture is then cooled to about room temperature or lower and filtered to remove insoluble impurities, e. g., polyacetoxymercuric-benzenes. The excess of benzene is removed from the filtrate by distillation, leaving as residue a solution or mixture of phenylmercuric acetate in acetic acid. The acetic acid is preferably, though not necessarily, removed by steam distillation. The residual aqueous solution or mixture of phenylmercuric acetate is treated at a temperature between 80° and 100° C. with sufficient water-soluble hydroxide, e. g. sodium hydroxide, potassium hydroxide, barium hydroxide, etc., to convert the phenylmercuric acetate into phenylmercuric hydroxide. The latter is removed by filtration and washed with water.

Phenylmercuric hydroxide prepared as described above, or otherwise, is suspended or dissolved in a substantially inert liquid, e. g., water, or alcohol, etc. The resultant mixture is treated with sufficient citric acid to neutralize the phenylmercuric hydroxide, or with excess citric acid if desired, the mixture preferably being stirred and heated to facilitate the neutralization. After the reaction is completed, the phenylmercuric citrate product is separated from the mixture by crystallization, by evaporation of the solvent, or otherwise, and may be purified by usual procedure. The product has a high phenol coefficient as compared with phenol itself, and is relatively non-toxic toward animals. It may be used as a germicide, disinfectant, or fungicide, etc.

The following example describes one way in which the principle of the invention has been applied, but is not to be construed as limiting the invention.

Example 15 grams (0.0715 mol) of citric acid monohydrate was added gradually and with stirring to a mixture of 54.9 grams (0.186 mol) of phenylmercuric hydroxide in 250 cubic centimeters of water. The mixture was stirred at room temperature for about one hour, after which it was heated under reflux for about 15 minutes, then cooled to about room temperature and filtered to separate the crystalline product. The latter was washed with water and dried. There was obtained 58.7 grams (0.0574 mol) of phenylmercuric citrate as a white, crystalline powder. The product decomposes at about 200°–204° C., is sparingly soluble in cold glacial acetic acid or hot cyclohexanol. It has probably the formula

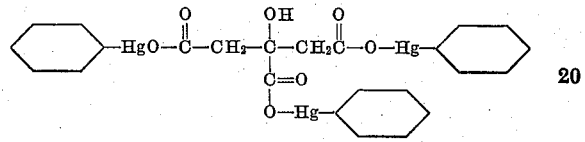

In place of phenylmercuric hydroxide, other phenylmercuric bases, e. g., phenylmercuric carbonate, may be used in preparing phenylmercuric citrate according to the invention. However, I prefer to employ phenylmercuric hydroxide rather than the corresponding carbonate as a reactant, since foaming usually occurs when the carbonate is used.

This application is a division of my co-pending application, Serial No. 683,017, filed July 31, 1933, Patent No. 2,157,009.

Other modes of applying the principle of the invention may be employed instead of those explained, change being made as regards the method or compounds herein disclosed, provided the steps or compounds stated by any of the following claims or the equivalent of such stated steps or compounds be employed.

I therefore particularly point out and distinctly claim as my invention:

1. In a method of making phenylmercuric citrate, the step of heating a phenylmercuric base with citric acid to a reacting temperature in the presence of a substantially inert liquid.

2. In a method of making phenylmercuric citrate, the step of heating phenylmercuric hydroxide with citric acid to a reacting temperature in the presence of a substantially inert liquid.

3. Phenylmercuric citrate.

RALPH P. PERKINS.